United States Patent
Kasahara et al.

(10) Patent No.: US 6,719,865 B2
(45) Date of Patent: Apr. 13, 2004

(54) METHOD FOR PRODUCING STIFFENED HOLLOW STRUCTURE COMPOSED OF FIBER-REINFORCED COMPOSITE

(75) Inventors: Yuki Kasahara, Saitama-ken (JP); Kenji Takenaka, Saitama-ken (JP); Makoto Nasu, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 315 days.

(21) Appl. No.: 10/000,217

(22) Filed: Dec. 4, 2001

(65) Prior Publication Data

US 2002/0068138 A1 Jun. 6, 2002

(30) Foreign Application Priority Data

Dec. 6, 2000 (JP) .......................... 2000-372116

(51) Int. Cl.$^7$ .................. B65H 81/00; B29C 53/00; B29C 53/36; B64C 1/00; B64C 1/12
(52) U.S. Cl. ............... 156/184; 156/160; 156/165; 156/185; 156/217; 156/218; 244/117 R; 244/119; 244/131; 428/35.7
(58) Field of Search ................ 156/184, 185, 156/186, 187, 217, 218, 196, 160, 165; 244/117 R, 118.1, 119, 120, 123, 125, 126, 127, 131; 428/35.7

(56) References Cited

U.S. PATENT DOCUMENTS 3,071,217 A * 1/1963 Gould ....................... 52/403.1
3,506,519 A     4/1970 Blumenkranz
4,086,378 A * 4/1978 Kam et al. ................. 428/34.5
4,584,041 A * 4/1986 Lyman et al. ............... 156/156
4,676,093 A * 6/1987 Pugnale et al. .............. 73/49.2
4,815,383 A     3/1989 Ward et al.
4,966,802 A * 10/1990 Hertzberg ................... 428/119
5,320,247 A * 6/1994 Sharp ......................... 220/654
5,499,904 A * 3/1996 Wallace et al. .............. 416/230
6,110,567 A * 8/2000 Bird ............................ 428/178
6,510,961 B1 * 1/2003 Head et al. ................... 220/645

FOREIGN PATENT DOCUMENTS

DE      2 013 285 A    10/1971
EP      0 201 479 A2   11/1986
JP      10-264257      10/1998    ........ B29C/65/42

* cited by examiner

Primary Examiner—Jeff H. Aftergut
Assistant Examiner—Justin Fischer
(74) Attorney, Agent, or Firm—Sughrue Mion, PLLC

(57) ABSTRACT

A method for efficiently producing a stiffened hollow structure from a first skin member, a second skin member and a stiffener each made of a fiber-reinforced composite with reduced steps, the stiffened hollow structure comprising a hollow skin portion and a stiffening portion for strengthening the hollow skin portion from the inside. The method comprises the steps of: (1) disposing the first skin member and the second skin member on the stiffener, an adhesive being provided between the stiffener and each of the first skin member and the second skin member; (2) placing a band on the outer surface of the first skin member and the second skin member; and (3) setting the adhesive while tightening the band and applying a tensile force to the first skin member and the second skin member.

9 Claims, 4 Drawing Sheets

METHOD FOR PRODUCING STIFFENED HOLLOW STRUCTURE COMPOSED OF FIBER-REINFORCED COMPOSITE

BACKGROUND OF THE INVENTION

The present invention relates to a method for producing a stiffened hollow structure of a fiber-reinforced composite comprising a hollow skin portion and a stiffening portion, in which an adhesive provided between a skin member and a stiffener is uniformly and efficiently set with a tensile force.

Recently, it has been desired to reduce a weight of a transport machine such as an aircraft and an automobile from viewpoints of conservation of the global environment and energy-saving. Therefore, researches have been in progress for using a fiber-reinforced composite excellent in lightweight, strength, corrosion resistance, oil resistance, etc. for the transport machine.

Conventionally, members of the fiber-reinforced composite have been bonded to each other by adhesive. For instance, a method using an unhardened prepreg as the adhesive for bonding the members has been disclosed in Japanese Patent Laid-Open No. 10-264257. The fiber-reinforced composite members are generally glued together while applying a pressure thereto to uniformly spread the adhesive all over the adhesion surface. As a method for applying a pressure, (i) methods using a clamp or a pressing apparatus, (ii) methods using a screw, a bolt and nut, etc. to utilize a tightening force due to screwing torque for pressing, etc. have been known.

To bond large-sized fiber-reinforced composite members to each other, in general, the members have been settled on a large jig of a metal and fixed by a rivet, a bolt, a clamp, etc. In the case of using the bolt, etc., a large number of apertures for bolts should be formed in the fiber-reinforced composite members, and after the bonding, the bolts should be removed from the apertures and the apertures should be filled up. Thus, such conventional methods use the large jig and comprise a large number of steps to be remarkably costly.

OBJECT AND SUMMARY OF THE INVENTION

Accordingly, an object of the present invention is to provide a method for producing a stiffened hollow structure, in which skin members and a stiffener each made of a fiber-reinforced composite are efficiently bonded together with reduced steps.

As a result of intensive research in view of the above object, the inventors have found that a stiffened hollow structure can be efficiently produced with reduced steps of disposing skin members on a stiffener through an adhesive, and setting the adhesive while applying a tensile force to the skin members and the stiffener by a band. The present invention has been accomplished by the finding.

Thus, a method of the present invention is for producing a stiffened hollow structure from a first skin member, a second skin member and a stiffener each made of a fiber-reinforced composite, the stiffened hollow structure comprising a hollow skin portion and a stiffening portion for strengthening the hollow skin portion from the inside, and the method comprises the steps of: (1) disposing the first skin member and the second skin member on the stiffener, an adhesive being provided between the stiffener and each of the first skin member and the second skin member; (2) placing a band on the outer surface of the first skin member and the second skin member; and (3) setting (or hardening) the adhesive while tightening the band and applying a tensile force to the first skin member and the second skin member.

In the method of the present invention, the adhesive is preferably a thermo-setting adhesion sheet, and the band is particularly preferably made of a carbon fiber-reinforced composite. Further, it is preferable that L-shaped angle plates are fixed on both ends of the band and that a tensile force-controlling shim is disposed between the L-shaped angle plates. It is preferred that one or two band is used for one adhesion portion, and it is also preferred that a buffer is disposed between the band and each of the first skin member and the second skin member.

The first skin member and the second skin member is preferably bonded such that an end portion of the first skin member and an end portion of the second skin member are overlapped each other through an adhesive, and a pressing force is applied to the end portions by a pressurizing jig comprising a magnet and a pressure-receiving jig of a magnetic material when the adhesive is set.

The method for producing a stiffened hollow structure according to the present invention is useful for the case where each of the first skin member and the second skin member has a semi-cylindrical shape and the stiffener has a cylindrical shape. Further, the method is particularly useful for producing a body structure of an aircraft composed of semi-cylindrical skin members and a body flame stiffening the skin members.

DETAILED DESCRIPTION OF THE PREFERRED EMBODIMENTS

A method of the present invention is for producing a stiffened hollow structure from a first skin member, a second skin member and a stiffener each made of a fiber-reinforced composite. In the method, the first skin member and the second skin member are efficiently bonded to the stiffener. The stiffened hollow structure comprises a hollow skin portion and a stiffening portion for strengthening the hollow skin portion from the inside, the hollow skin portion being composed of the first skin member and the second skin member, and the stiffening portion being composed of the stiffener. The method of the present invention comprises the steps of: (1) disposing the first skin member and the second skin member on the stiffener, an adhesive being provided between the stiffener and each of the first skin member and the second skin member; (2) placing a band on the outer surface of the first skin member and the second skin member; and (3) setting (or hardening) the adhesive while tightening the band and applying a tensile force to the first skin member and the second skin member.

Each of the first skin member, the second skin member and the stiffener is made of a fiber-reinforced composite. The fiber-reinforced composite may be composed of a reinforcing fiber such as a carbon fiber, a glass fiber, an aramid fiber, etc. impregnated with a resin such as a polyester, an epoxy resin, a bismaleimide resin, a phenol resin, a melamine resin, a silicone resin, etc.

Although shapes of the skin members and the stiffener are not particularly limited, the method of the present invention is useful for the case where the first skin member and the second skin member are in a semicylindrical shape and the stiffener is in a cylindrical shape. Further, the method is particularly useful for producing a body structure of an aircraft composed of semi-cylindrical skin members and a body flame stiffening the skin members. An embodiment of the present invention, in which a body structure of an aircraft is produced by bonding a first semi-cylindrical skin member and a second semi-cylindrical skin member to a cylindrical stiffener acting as a body flame, will be described in detail below with reference to drawings without intention of restricting the scope of the present invention defined by the claims attached hereto.

(1) Disposing Skin Members on Stiffener

Figure 1:
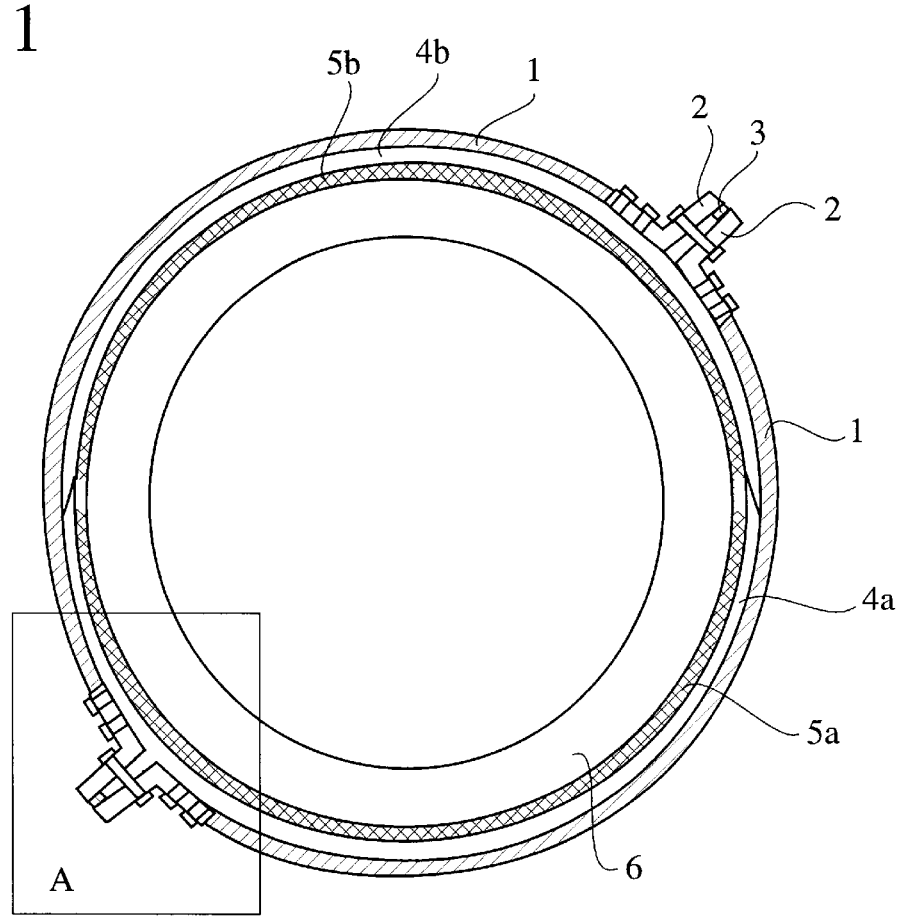
FIG. 1 is a schematic cross-sectional view showing an embodiment where a body structure of an aircraft is produced by the method according to the present invention.

As shown in FIG. 1, a first semi-cylindrical skin member 4a is disposed on the lower semicircular side of a cylindrical stiffener 6 made of a fiber-reinforced composite, an adhesion sheet 5a in an unhardened (unset) state being provided between the first semi-cylindrical skin member 4a and the cylindrical stiffener 6. Then, a second semi-cylindrical skin member 4b is disposed on the upper semicircular side of the cylindrical stiffener 6, an adhesion sheet 5b in an unhardened state being provided therebetween. Each of the first semi-cylindrical skin member 4a and the second semi-cylindrical skin member 4b is made of a hardened fiber-reinforced composite.

The adhesive used in the present invention is not particularly limited. In the case of producing the body structure of the aircraft, etc., it is preferred that the adhesive hardly causes creep by a great loading and has resistance to heat, water, oil, a solvent such as gasoline, etc. Preferred examples of the adhesive include thermo-setting adhesives such as epoxy-based adhesives, phenol-based adhesives and resorcinol-based adhesives. A synthetic rubber or a thermoplastic adhesive may be mixed with the thermo-setting adhesive. Although the adhesive may be applied to the stiffener and/or the skin members, an adhesion sheet comprising the thermo-setting adhesive is preferably used as this embodiment. In general, setting (hardening) temperature of the thermo-setting adhesive is preferably 120 to 180° C. In the case of using a pressurizing jig comprising a magnet and a pressure-receiving jig of a magnetic material that will be described below, the setting temperature is preferably lower than a temperature, which the magnet and the magnetic material have resistance to. More specifically, "AF163-2K" having a setting temperature of 120° C. manufactured by 3M Company, United States, "FM300-2" having a setting temperature of 120 to 180° C. manufactured by Cytec Fiberite Inc., United States, etc. can be preferably used as the adhesive.

(2) Placing Band on Skin Members

Figure 2:
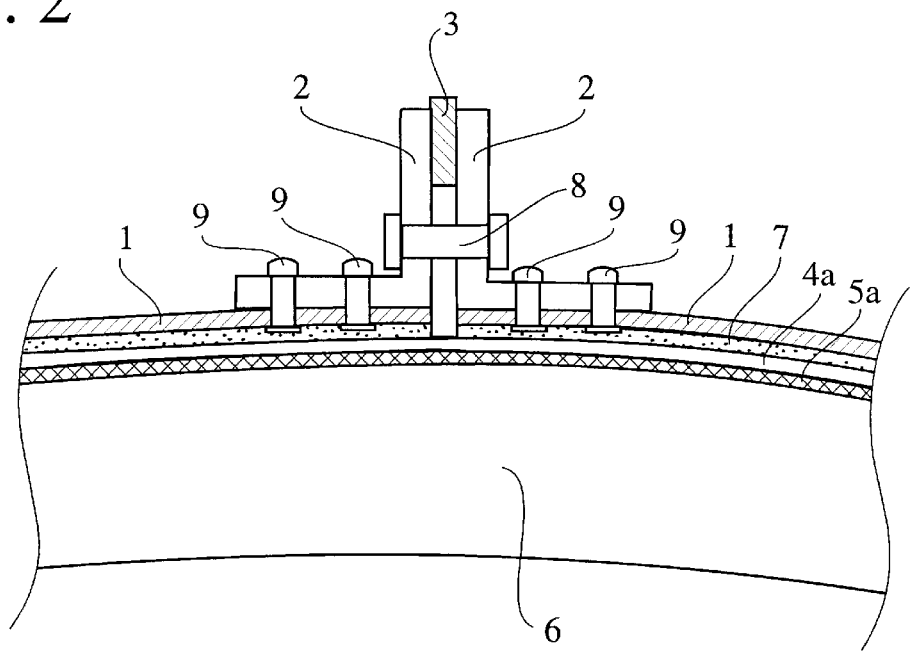
FIG. 2 is an enlarged, schematic cross-sectional view showing a portion A of FIG. 1.

Next, as shown in FIG. 1, two bands 1 are placed on the outer surfaces of the semi-cylindrical skin members 4a and 4b corresponding to a portion where the cylindrical stiffener 6 is disposed from the inside. It is preferable in the present invention that L-shaped angle plates 2 are disposed and fixed on both ends of each band 1 as shown in FIGS. 1 and 2. A tensile force-controlling shim 3 is preferably provided between the L-shaped angle plates 2. The L-shaped angle plate and the tensile force-controlling shim used in the present invention are preferably made of a lightweight material high in strength such as aluminum, iron, a stainless steel, etc., more preferably made of aluminum.

The band preferably exhibits a sufficient thermo-resistance at the setting temperature of the adhesive, and it is preferable that the tensile force is not reduced by thermal expansion of the band. Further, the band preferably has a certain level of softness, flexibility or elasticity such that the tensile force is not reduced by sectional ununiformity or minute unevenness, etc. of the skin members. Material used for the band is preferably a carbon fiber-reinforced composite, iron or stainless steel. The band is particularly preferably made of a carbon fiber-reinforced composite to prevent the reduction of the tensile force due to the thermal expansion of the band. Although the number of the band used for one portion, in which the stiffener is bonded to the skin members, is not particularly limited if only a desired tensile force can be obtained, the number is preferably two or less from the viewpoint of improving the work efficiency. Length of the band may be controlled such that a desired tensile force is obtained by tightening the band. Thickness of the band is preferably 1.5 to 4 mm from the viewpoints of workability, durability, etc. though it is not particularly limited.

It is preferred that a buffer 7 is provided between the band 1 and each skin member to improve conformability of the band 1 to the skin member as shown in FIG. 2. The buffer used in the present invention is preferably a silicone sheet or a teflon sheet. Thickness of the buffer is not particularly limited and preferably 3 to 5 mm.

The first skin member, the second skin member and the stiffener is preferably set in the prescribed position by a pin, a bolt and nut, a rivet, a sheet clamp, etc. before the band is put on the outer surfaces of the skin members. The number of the pin, etc. is desirable as few as possible to prevent increase of steps.

(3) Setting of Adhesive

The adhesive is set or hardened while tightening the band and applying the tensile force to the skin members. Although a method for applying the tensile force is not particularly limited, it is preferred that the L-shaped angle plates 2 are fixed on ends of the bands 1 by binding metals 9, etc., the tensile force-controlling shim 3 is disposed between the L-shaped angle plates 2, and the bands 1 are tightened by combination of a bolt and nut 8 as shown in FIG. 2. The tensile force may be selected by controlling a thickness of the tensile force-controlling shim 3. In this method using the L-shaped angle plate and the tensile force-controlling shim, the tensile force is uniformly applied to entire bonding portion in the outer surface. In contrast with this, in a method where a band longer than the periphery of the skin members having a width equal to that of the bonding portion is disposed around the periphery to pull both ends of the band in opposite directions, the tensile force is unavoidably applied to the other portion than the bonding portion, failing to uniformly apply the tensile force to entire bonding portion in the outer surface.

The tensile force is preferably controlled such that an adhesion pressure is 0.025 to 2 $kgf/cm^2$ in the bonding portion. The adhesion pressure is particularly preferably 0.2 to 1 $kgf/cm^2$. When the adhesion pressure is less than 0.025 $kgf/cm^2$, the adhesion surfaces of the skin members and the stiffener often fail to uniformly come in contact with the adhesive to reduce bonding strength between the skin members and the stiffener. On the other hand, the bonding strength is improved only slightly even if the adhesion pressure of more than 2 $kgf/cm^2$ is further increased.

Figure 3:
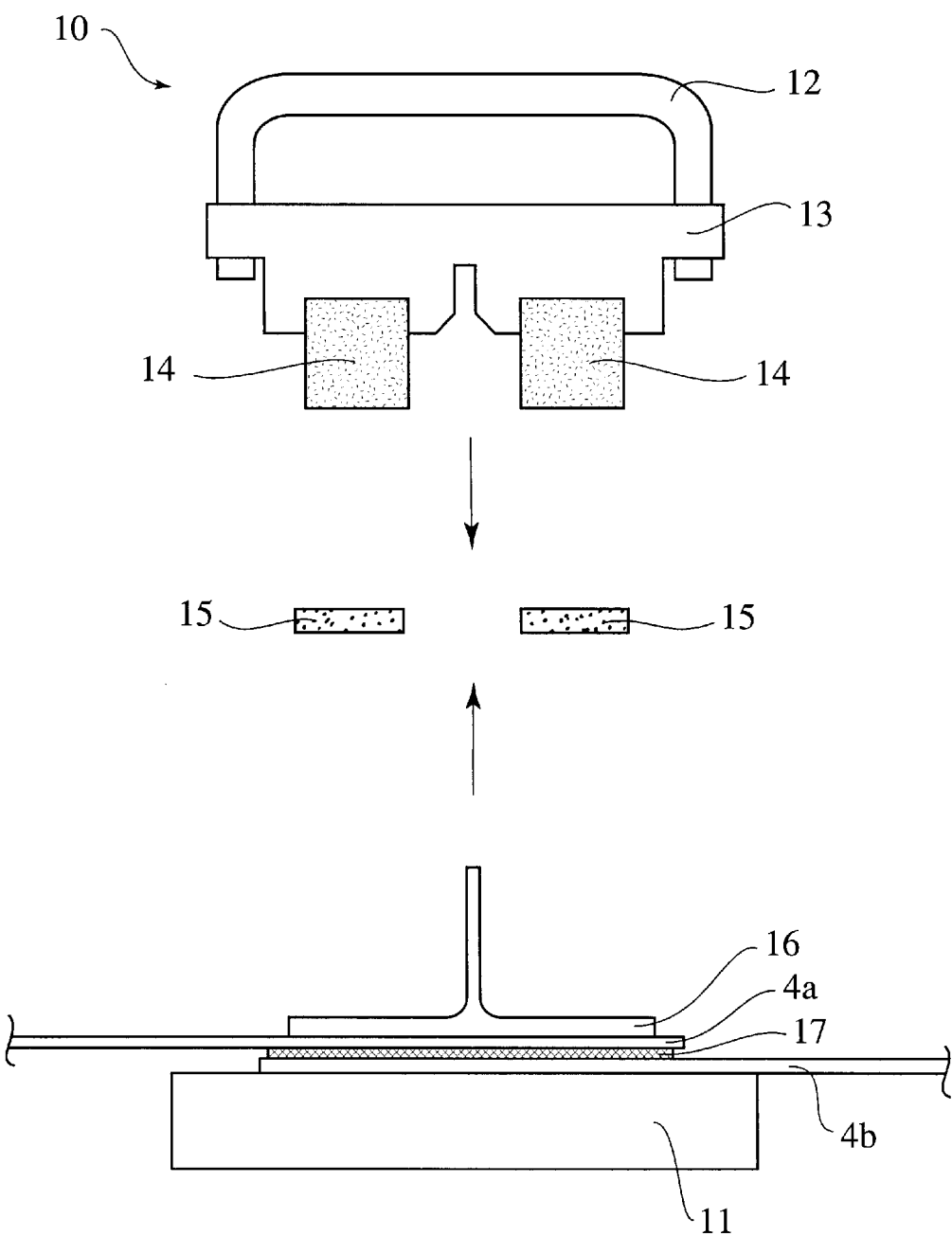
FIGS. 3 and 4 are a partial, schematic cross-sectional view showing a step where a pressing force is applied to first and second semi-cylindrical skin members by a pressurizing jig and a pressure-receiving jig, respectively.
Figure 4:
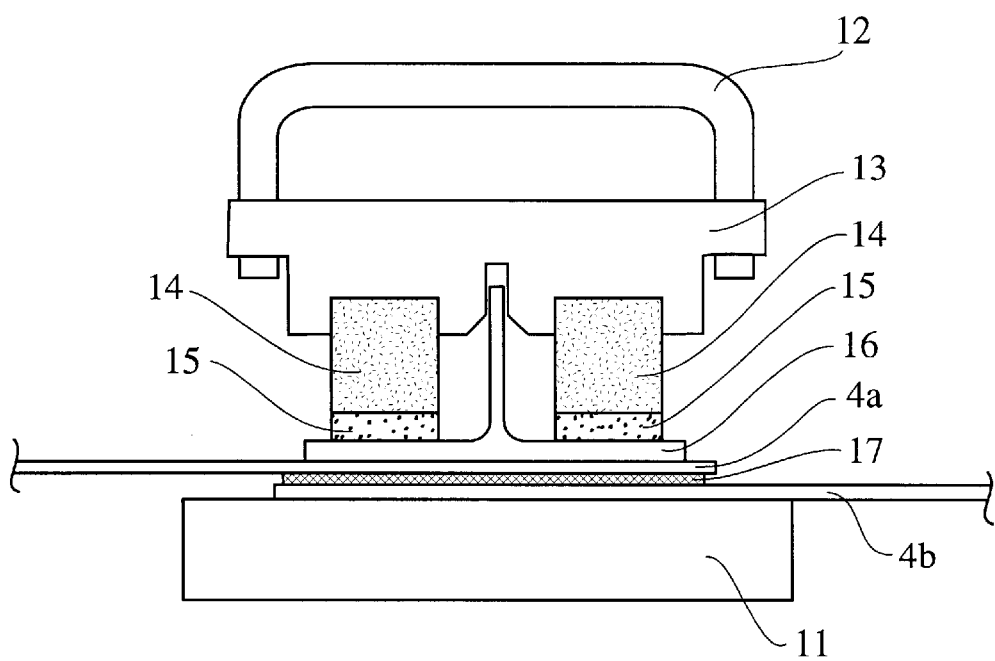

As shown in FIGS. 3 and 4, an end portion of the first semi-cylindrical skin member 4a and an end portion of the second semi-cylindrical skin member 4b are preferably overlapped each other and an adhesive such as an unset adhesion sheet 17 is preferably provided between the end portions when the tensile force is applied. The number of the adhesion sheet may be selected depending on the overlapped area, and generally, the number is preferably one. In the case of using too many adhesion sheets, the resultant stiffened hollow structure is often poor in dimensional accuracy. Incidentally, shapes of the skin members are not limited to the drawings and the skin members may have other shape.

In the step of setting the adhesive, it is preferred that the end portions of the first and second semi-cylindrical skin members 4a and 4b are sandwiched between a pressurizing jig 10 comprising a magnet and a pressure-receiving jig 11 of a magnetic material, whereby a pressing force is applied to the end portions by an attracting force between the magnet and the magnetic material as shown in FIGS. 3 and 4. The pressurizing jig 10 comprises a handle 12, a magnetic portion 13 and magnets 14 and used in combination with the pressure-receiving jig 11. Thus, the pressure-receiving jig 11 is disposed on the end portion of the second semi-cylindrical skin member 4b, and then, the pressurizing jig 10 is disposed on the end portion of the first semi-cylindrical skin member 4a to apply the pressing force. A pressure-receiving surface of the pressure-receiving jig 11 is preferably in shape suitable for the outer surface shape of the second semi-cylindrical skin member 4b, and a pressurizing surface of the pressurizing jig 10 is preferably in shape suitable for the outer surface shape of the first semi-cylindrical skin member 4a. Another pressurizing jig comprising a magnet may be used instead of the pressure-receiving jig 11 so that a pressing force is applied to the end portions of the first and second semicylindrical skin members 4a and 4b by an attracting force between the pressurizing jigs.

Size and magnetic force of the magnet used for the pressurizing jig may be appropriately selected in accordance with thickness and area of the end portions of the skin members, kind of the magnetic material used for the pressure-receiving jig, etc. In general, the size and the magnetic force are preferably selected such that the pressing force provided by the pressurizing jig and the pressure-receiving jig is 0.025 to 0.8 kgf/cm$^2$ in the end portions. The pressing force is particularly preferably 0.2 to 0.6 kgf/cm$^2$. When the pressing force is less than 0.025 kgf/cm$^2$, the end portions of the skin members often fail to uniformly come in contact with the adhesive to reduce bonding strength between the skin members, and there is a case where the pressurizing jig and the pressure-receiving jig are dropped due to their own weight. On the other hand, when the pressing force exceeds 0.8 kgf/cm$^2$, the bonding strength is improved only slightly and it becomes difficult to put on and off the pressurizing jig and the pressure-receiving jig.

The magnet used for the pressurizing jig is preferably a permanent magnet from the viewpoint of workability. In the case of using the thermo-setting adhesive, the magnet preferably has resistance to a temperature of 130° C. or more. For example, "NEOMAX-39SH" having resistance to temperature of 140° C. manufactured by Sumitomo Special Metals Co., Ltd. may be used as such a magnet. As shown in FIG. 3, the pressurizing jig 10 may comprise the magnetic portion 13 and the handle 12 connecting to the magnets 14 to improve handling.

In FIGS. 3 and 4, the magnetic portion 13 is in such a shape that can utilize a stringer member 16 made of a fiber-reinforced composite for positioning. Incidentally, shapes of the magnet and the magnetic portion are not limited to FIGS. 3 and 4 and the pressurizing jig may have a different shape. Further, it is preferable that the pressurizing jig comprises a couple of magnets disposed such that the magnetic poles thereof direct in opposite directions as shown in FIGS. 3 and 4, thereby making the magnets form circumferential magnetic paths to apply the pressing force to entire bonding surface of the end portions.

As shown in FIGS. 3 and 4, buffers 15 is preferably provided between the pressurizing surface of the pressurizing jig 10 and the outer surface of the first semi-cylindrical skin member 4a to improve workability of removing the pressurizing jig 10 and conformability between the pressurizing jig 10 and the first semi-cylindrical skin member 4a. The buffer is preferably a silicone sheet or a teflon sheet. Thickness of the buffer is not particularly limited and preferably 1 to 3 mm. In the case of using the buffer, the magnetic force of the magnet used for the pressurizing jig is preferably selected such that the pressing force provided by the pressurizing jig and the pressure-receiving jig through the buffer is 0.025 to 0.8 kgfcm$^2$ in the end portions. Further, the skin members may be set in the prescribed position by a pin, a bolt and nut, a rivet, a sheet clamp, etc. before the pressurizing jig and the pressure-receiving jig are put on the first and second skin members. The number of the pin, etc. is desirable as few as possible to prevent increase of processes.

Figure 5:
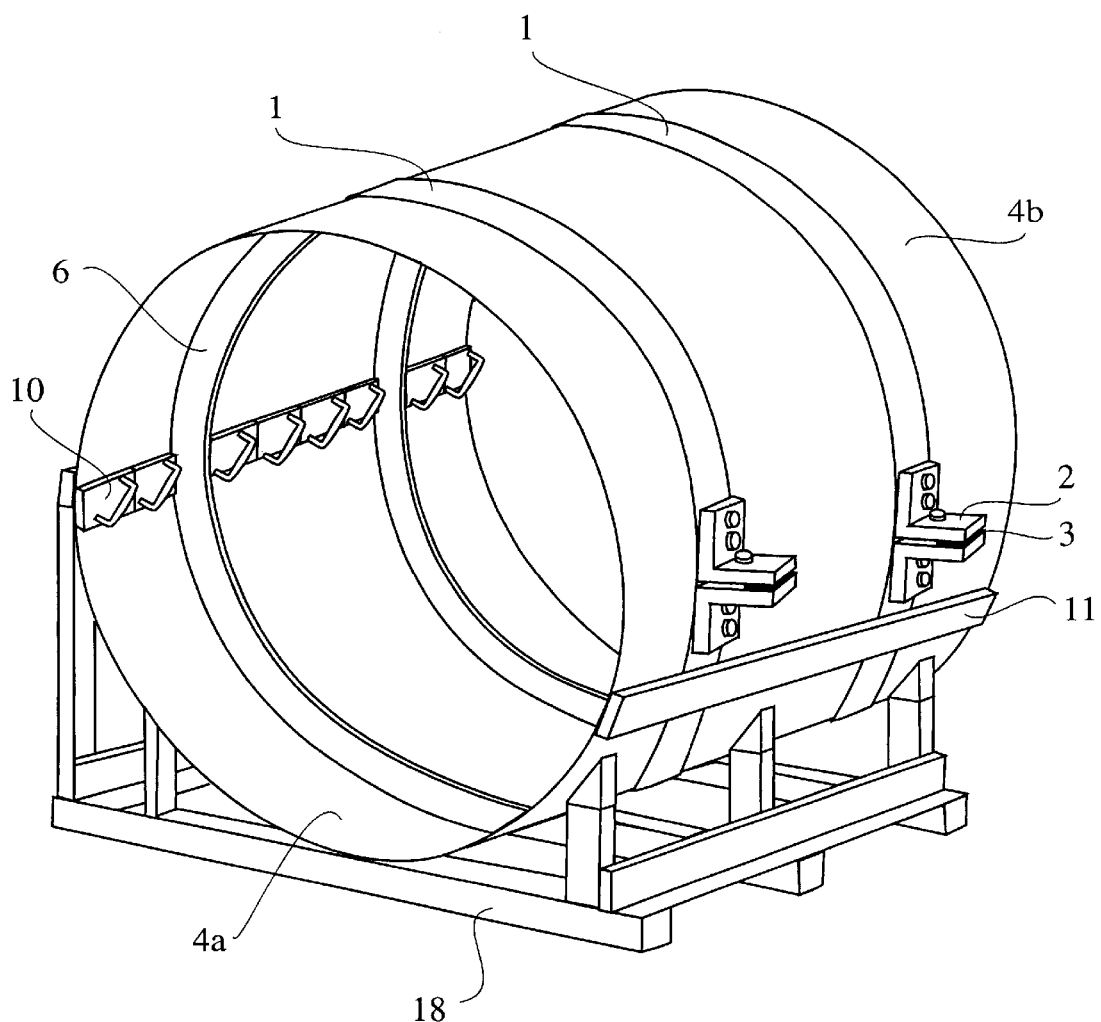
FIG. 5 is a schematic perspective view showing an embodiment where a body structure of an aircraft is produced by the method according to the present invention.

FIG. 5 is a schematic perspective view showing an embodiment where a body structure of an aircraft is produced by the method of the present invention. In this embodiment, the bands 1 are disposed around the bonding portion of the first and second semi-cylindrical skin members 4a and 4b to apply a predetermined tensile force, the pressurizing jigs 10 and the pressure-receiving jigs 11 are disposed on the end portions of the first and second semi-cylindrical skin members 4a and 4b to apply a predetermined pressing force, whereby the cylindrical stiffeners 6 are bonded with the first semi-cylindrical skin member 4a and the second semi-cylindrical skin member 4b. In this invention, each member may be set in the prescribed position by only a small jig such as a positioning jig 18 shown in FIG. 5 without a conventional large jig.

In the case of using the thermo-setting adhesive, the stiffener, the first skin member and the second skin member may be bonded to each other by heating at the setting temperature of the adhesive or higher while applying the tensile force and the pressing force. A heating method is not particularly limited. Although only the bonding portions may be locally heated by a hot blast, etc., the stiffener and the skin members are often broken by thermal expansion of a locally heated portion. Thus, it is preferred that the stiffener, the skin members and the adhesive are uniformly heated by a soaking furnace, etc. In the case of using the pressurizing jig and the pressure-receiving jig, the heating temperature is lower than a temperature to which the magnet in the pressurizing jig has resistance, preferably 100 to 130° C., more preferably 110 to 120° C. When the heating temperature is lower than 100° C., there is a case where the thermo-setting adhesive is insufficiently hardened, failing to provide a sufficient bonding strength.

In general, the stiffener, the skin members and the adhesive may be heated at the heating temperature for 60 to 70 minutes while applying the tensile force to provide a stable bonding strength. In the case where the stiffener or the skin members is large in size, the stiffener or the skin member is often subjected to a stress due to a strain or a deformation provided in a heating process and a cooling process to be cracked. Thus, it is preferred that heating is carried out gradually or gently over a long period of time such as 4 to 8 hours in this case.

If the pin, etc. is used for positioning, the pin, etc. may be removed from the resultant stiffened hollow structure or left therein after the adhesion. In the case of removing the pin, etc., the resulting aperture may be coated with an epoxy resin, etc. In the case of leaving the pin, etc., a flush-type pin is preferably used and a hole in head of the pin may be coated with an epoxy resin, etc. to prevent corrosion of the pin.

Though the method of the present invention has been explained above with reference to the attached drawings, the present invention is not restricted thereto and any variations and modifications are possible unless the scope and spirit of the present invention are changed.

As described in detail above, the stiffened hollow structure can be effectively produced by the method of the present invention where a plurality of the fiber-reinforced composite members are bonded each other with reduced steps.

What is claimed is:

1. A method for producing a stiffened hollow structure from a first skin member, a second skin member and a stiffener each made of a fiber-reinforced composite, said stiffened hollow structure comprising a hollow skin portion and a stiffening portion for strengthening said hollow skin portion from the inside, wherein said method comprises the steps of: (1) disposing said first skin member and said second skin member on said stiffener, an adhesive being provided between said stiffener and each of said first skin member and said second skin member; (2) placing a band on the outer surface of said first skin member and said second skin member; and (3) setting said adhesive while tightening said band and applying a tensile force to said first skin member and said second skin member.

2. The method for producing a stiffened hollow structure according to claim 1, wherein said adhesive is a thermo-setting adhesion sheet.

3. The method for producing a stiffened hollow structure according to claim 1, wherein said band is made of a carbon fiber-reinforced composite.

4. The method for producing a stiffened hollow structure according to claim 1, wherein L-shaped angle plates are fixed on both ends of said band and a tensile force-controlling shim is disposed between said L-shaped angle plates.

5. The method for producing a stiffened hollow structure according to claim 1, wherein one or two said band is used.

6. The method for producing a stiffened hollow structure according to claim 1, wherein an end portion of said first skin member and an end portion of said second skin member are overlapped each other through an adhesive and a pressing force is applied to the end portions by a pressurizing jig comprising a magnet and a pressure-receiving jig of a magnetic material when said adhesive is set.

7. The method for producing a stiffened hollow structure according to claim 1, wherein a buffer is disposed between said band and each of said first skin member and said second skin member.

8. The method for producing a stiffened hollow structure according to claim 1, wherein said first skin member and said second skin member are in a semi-cylindrical shape and said stiffener is in a cylindrical shape.

9. The method for producing a stiffened hollow structure according to claim 1, wherein said stiffened hollow structure is a body structure of an aircraft.

* * * * *